UNITED STATES PATENT OFFICE.

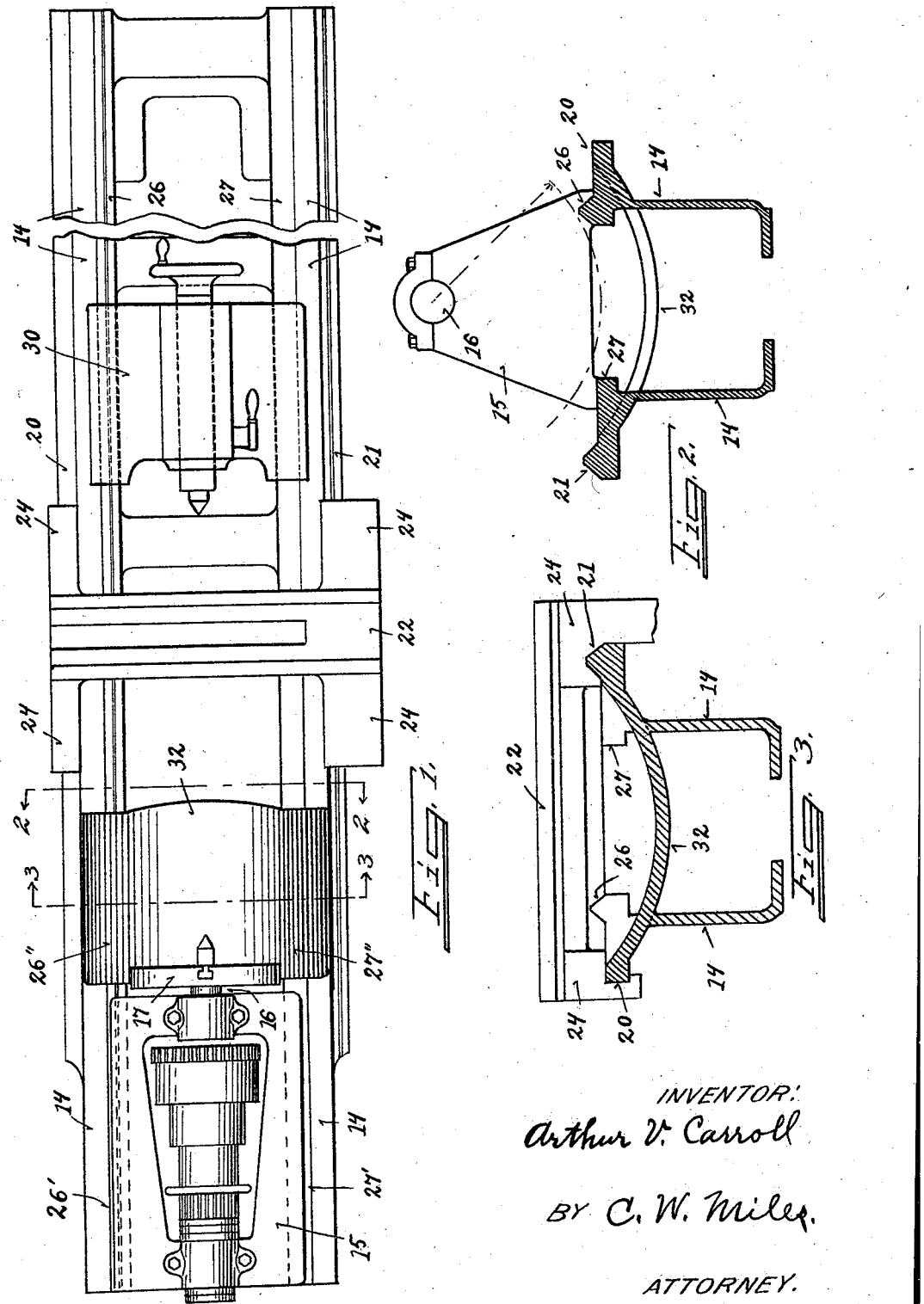

ARTHUR V. CARROLL, OF CINCINNATI, OHIO.

LATHE.

1,414,176. Specification of Letters Patent. Patented Apr. 25, 1922.

Application filed January 28, 1921. Serial No. 440,755.

*To all whom it may concern:*

Be it known that I, ARTHUR V. CARROLL, a citizen of the United States, residing at Cincinnati, in the county of Hamilton and State of Ohio, have invented certain new and useful Improvements in Lathes, of which the following is a specification.

My invention relates to improvements in lathe frames. One of its objects is to provide a lathe frame or bed in which the carriage and tailstock are provided with ways or supports and are adjustable as close as required to the headstock, and in which provision is made for an increased swing to accommodate relatively larger chuck and relatively larger work members than heretofore. Another object is to provide a lathe frame substantially as above specified in which the strength and rigidity of the frame is not interfered with, and in which the usefulness of the lathe frame as a support and guide for the tool carriage and tail-stock is not impaired or its standard dimensions departed from. My invention also comprises certain details of form combination and arrangement all of which will be fully set forth in the description of the accompanying drawings in which:

Fig. 1 is a plan of a lathe embodying my improvements.

Fig. 2 is a transverse section through the frame on line 2—2 of Fig. 1.

Fig. 3 is a transverse section through the frame on line 3—3 of Fig. 1.

The accompanying drawings illustrate the preferred embodiment of my invention in which 14 represents the main frame or bed of a lathe upon which is rigidly mounted at one end a headstock 15 provided with a rotary spindle 16 adapted to receive any one of a variety of chucks or face plates 17 to support the work.

The lathe bed is provided with one set of ways 20 and 21 which extend practically the full length of the lathe bed from about midway of the headstock to the opposite end of the lathe bed and are in position to support the lathe tool carriage 22 from one end to the other of its lateral arms or guide bars 24, particularly when the carriage 22 is relatively close to the headstock, where it is liable to be most extensively positioned and employed. The arms 24 of the carriage are designed to afford a firm non-vibratory support for the carriage upon the lathe ways, and when the carriage approaches the headstock or the tail-stock it is desirable that said arms may pass along side of and outside of said headstock or tail stock, so as to continue to afford a firm support to the carriage and at the same time to permit the central portion of the carriage to closely approach the headstock or tailstock.

A pair of ways 26 and 27 independent of the ways 20 and 21 are therefore provided on which the tailstock 30 is adjustable endwise, and adapted to be clamped to any adjusted position. Extensions 26′ and 27′ of the ways 26 and 27 are preferably but not necessarily provided under the headstock to form an accurately faced section of the bed on which to clamp the headstock.

The ways 26 and 26′ and 27 and 27′ are not continuous, there being a gap therein at 26″ and 27″ of greater or less length in front of the headstock and where the tailstock is less liable to be required. Practically coextensive with said gaps 26″ and 27″ in the ways is an apron or web of metal 32 forming an integral portion of the lathe frame and with its upper face constituting the arc of a cylinder with the axis of lathe spindle as its axis. Said web 32 serves to compensate for the gap in the ways 26 and 27 and to preserve or even increase the strength, and rigidity of the lathe bed at that locality while at the same time locally increasing the distance from the spindle axis to the bed and affording locally a capacity to employ and swing chucks and face plates, and also work members of greater diameter than at other points along the lathe bed.

I am thus enabled without materially departing from the standard types and dimensions of lathe beds to provide a lathe bed having continuous ways for the tool carriage and without materially abridging the usefulness and range of adjustment of the tailstock to provide a section of the bed where work and holding tools requiring a greater swing are capable of being employed and operated upon.

The mechanism herein illustrated and described is capable of considerable modification without departing from the principle of my invention.

What I claim is:—

1. In a lathe a lathe bed having a headstock rigidly mounted upon one end thereof, a pair of ways continuous from the headstock to the opposite end of the lathe bed to serve as guides for a lathe tool carriage, a pair of ways to serve independently of the tool carriage ways as supports for a tailstock and terminating some distance from the headstock to provide a space intervening between the headstock and the terminus of the tailstock ways where the distance between the lathe spindle axis and adjacent portion of the lathe bed is greater than opposite the tailstock ways.

2. In a lathe a lathe bed having a headstock rigidly mounted upon one end thereof, a pair of ways continuous from the headstock to the opposite end of the lathe bed, to serve as guides for a lathe tool carriage, a pair of ways to serve independently of the tool carriage ways as supports for a tailstock and terminating some distance from the headstock to provide a space intervening between the headstock and the terminus of the tailstock ways where the distance between the lathe spindle axis and the adjacent portion of the lathe bed is greater than opposite the tailstock ways and an apron formed integral with the lathe bed intermediate of the head stock and said tailstock ways to insure maximum strength of the lathe bed at said locality.

3. In a lathe a lathe bed having a headstock rigidly mounted upon one end thereof, a pair of ways continuous from the headstock to the opposite end of the lathe bed to serve as guides for a lathe tool carriage, a pair of ways to serve independently of the tool carriage ways as supports for a tailstock and terminating some distance from the headstock to provide a space intervening between the headstock and the terminus of the tailstock ways, where the distance between the lathe spindle axis and the adjacent portion of the lathe bed is greater than opposite the tailstock ways, and means to permanently compensate for the gap in said tailstock ways and locally maintain the strength of the lathe bed at a maximum.

4. In a lathe, a lathe bed having a headstock rigidly mounted upon one end thereof, a pair of ways continuous from the headstock to the opposite end of the lathe-bed to serve as guides for a lathe tool carriage, a pair of ways in substantially the same horizontal plane with said tool carriage ways to serve independently of the tool carriage ways as supports for a tailstock and terminating some distance from the headstock to provide a space intervening between the headstock and terminus of the tailstock ways where the distance between the lathe spindle axis and adjacent portions of the lathe bed is greater than opposite the tailstock ways.

In testimony whereof I have affixed my signature.

ARTHUR V. CARROLL.